Figure 1:
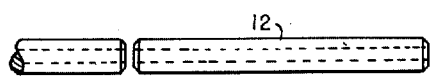

Feb. 6, 1951   R. J. NOVY   2,540,688
METHOD OF MANUFACTURING BEARINGS
Filed Oct. 3, 1947   2 Sheets-Sheet 1

*INVENTOR.*
RICHARD J. NOVY
BY
ATTORNEY

Feb. 6, 1951 R. J. NOVY 2,540,688
METHOD OF MANUFACTURING BEARINGS
Filed Oct. 3, 1947 2 Sheets-Sheet 2
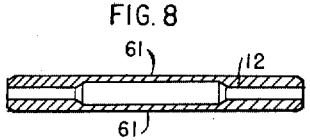
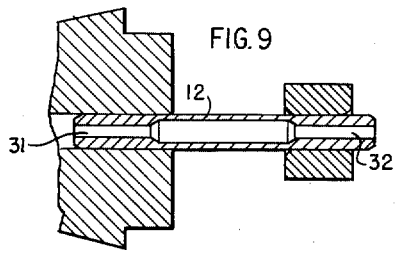
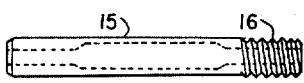
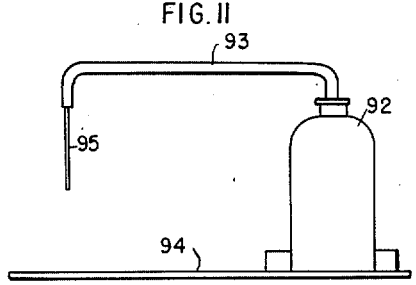
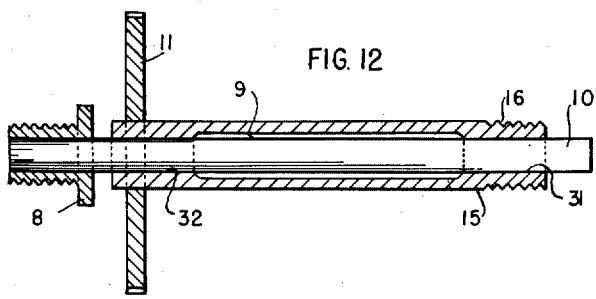
INVENTOR.
RICHARD J. NOVY
BY
ATTORNEY

Patented Feb. 6, 1951

2,540,688

UNITED STATES PATENT OFFICE 2,540,688

METHOD OF MANUFACTURING BEARINGS

Richard J. Novy, Chicago, Ill., assignor to Automatic Electric Laboratories, Inc., Chicago, Ill., a corporation of Delaware Application October 3, 1947, Serial No. 777,705

4 Claims. (Cl. 29—149.5)

This invention relates in general to an improved hub and method of forming the hub, and more specifically to a hub for carrying a rotating element and having a space inside the hub for permanently retaining an amount of grease or other lubricant between relatively moving elements.

One feature of the invention relates to the novel method of forming the lubricant reservoir inside the hub to retain the grease or oil between the hub and the shaft upon which it rotates.

Another feature is the novel method of utilizing hydraulic pressure to form the hub by bulging the center portion and subsequently reducing the outer portion of the bulge to the same size as the remainder of the element.

Another feature is the provision of a hub having a storage space or cavity on the inside central portion thereof for holding lubricant, so that it can be mounted on a shaft of equal diameter throughout its length for rotation thereon.

The invention is illustrated in connection with a hub designed for use as a support for the rotating element or ratchet wheel of a step-by-step switch such as the so called rotary line switch used in automatic telephone systems. In this switch a fixed shaft carries a hub which rotates thereon and the hub supports a set of spring wipers which progressively make contact with different contacts in an arcuate contact bank as the wipers are rotated. The hub has a ratchet wheel fixed thereto which is acted upon by a reciprocating pawl magnet operated, to rotate the hub on its shaft.

In prior art, space has been provided within a hub for a lubricant by hollowing out a part of the material of which the shaft is made, but in addition to weakening the shaft near its center, the narrowed portion gave the shaft an inclination to warp with the result that the two ends of the shaft would be out of alignment.

The unique method of this invention in providing the necessary storage space for a lubricant, by enlarging a portion of the hub, leaves the shaft intact, the same diameter throughout its length and eliminates all chances of warping. The special tools and dies and also the method of eliminating the air from the tube while filling the hollow tube with a non-compressible liquid, are also features of this invention.

The invention is described and illustrated in accordance with the accompanying drawings consisting of twelve figures on 2 sheets.

Figure 2:
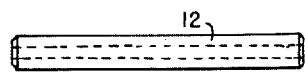
Figure 3:
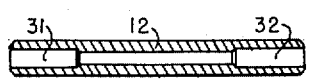
Figure 4:
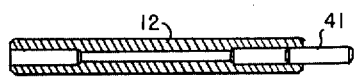
Figure 5:
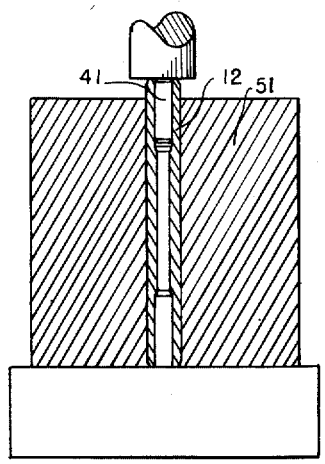
Figure 6:
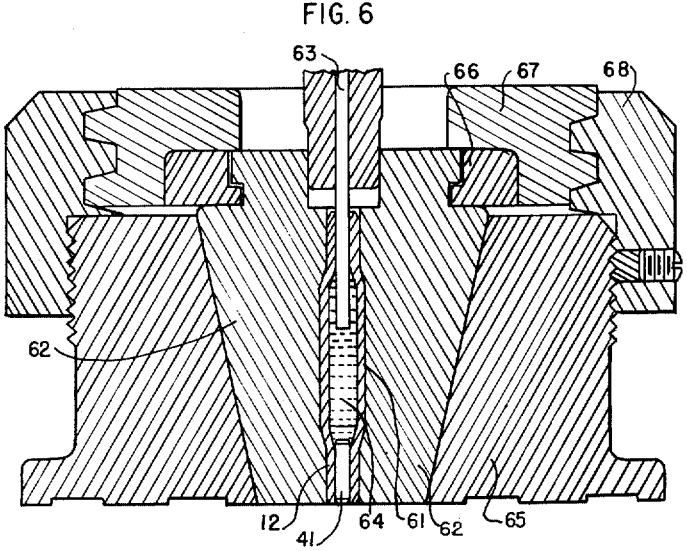

In the drawings Figure 1 refers to the first step in the method of manufacturing the hub of this invention, that is to cut the required length from previously manufactured seamless tubing. Figure 2 refers to the second step in which the tube 12 is ground on the outside to remove any defects. Figure 3 shows a section of each end, at 31 and 32, of the tube 12 which are reamed to remove any defects in those portions which will form the bearings of the completed hub. Figure 4 shows the beginning of the operation to temporarily close one end of the tube 12 with a tightly fitting plug 41. Figure 5 shows the tube 12 being held in a vertical position while the plug 41 is driven into position. Before passing from the operation illustrated in Figure 5 to Figure 6, the tube 12 is filled with a liquid 64 by a special process and with special equipment, illustrated in Figure 11. Figure 6 shows the tube 12 with its central portion 61 enlarged and still being confined in the die 62. The plunger 63 which had entered the top open end of the tube to transmit pressure upon the liquid 64, within the tube, is shown at approximately its lowest point of downward movement.

Figure 7:
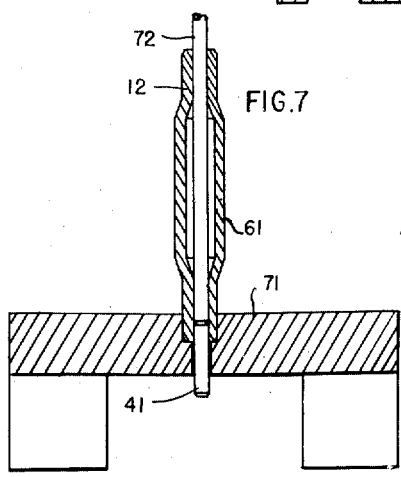

Figure 7 shows the tube 12 after being removed from the die 62 and placed in a vertical position over a hole in a bench fixture 71 and a tool 72 is being used to remove the plug 41 which was employed to close one end during the bulging operation. Figure 8 calls attention to the eighth step in the process, the second outside grinding operation. The second internal reaming of the two end portions is the ninth step, shown in Figure 9. The final step, Figure 10 is the threading of one end of the tube on the outside. Figure 11 illustrates the container for the liquid used in filling the tube, prior to the bulging or expanding operation of the central portion. Figure 12 shows the hub 15 together with a ratchet wheel 11, mounted on a shaft 19.

In constructing the hub 15 in accordance with the preferred method of this invention, a high quality seamless tubing is selected, such as seamless steel or other material, having an outside diameter slightly larger than the diameter required for the finished product. The hole through the tube is slightly smaller in diameter than the shaft on which the finished hub will rotate. The first operation is to cut a piece of tubing the required length such as 12. When the material being used is such as to require annealing, this would be done before the first grinding operation, as called for in Figure 2. This is a centerless grind of the outside surfaces of the tube to remove any defects and to assure that the entire length of this cut-to-required-length tube is of the same diameter within a very narrow tolerance of approximately two ten-thousandths of an inch.

Figure 3 has reference to the third step in which the hole in the tube 12 is reamed from each end to a distance of approximately one quarter of its length. This reaming is also held to a very close tolerance, approximately six ten-thousandths of an inch, as a successful bulging or expanding operation depends, in part, to the close fitting of the plug 41 in one end of this tube and the close fitting of the plunger 63 to be inserted in the other end of the tube. The plug 41 is shown entering one end of the tube 12 in Figure 4 and in Figure 5 the tube 12 has been placed in a recess in a block of material 51 where sufficient power can be brought to bear on the plug 41 to force it into the end of the tube 12.

Figure 6 is a cross section view of a special die, with a section view of one tube, such as tube 12 of this invention. In this view the bulging operation has been completed and the plunger 63 can be withdrawn. It will be noted that the die is an elaborate tool which is used in connection with a well known punch or similar press (not shown), wherein considerable pressure can be concentrated between plunger 63 and the punch supporting table (not shown), on which the die 62 is placed. The portion 65 is a cast or machined block of substantial proportions. The members 62 and 62 are the two halves of a cone shaped die which can be easily removed and replaced in the member 65. These cone members 62 are cut away at their centers to form a cavity in which a tube 12 can be placed. After the cone members have been placed together with a tube in the cavity, these members are placed in a hole in the block 65. Three locking members 66, 67, and 68, are now assembled in place and by means of the threads shown and the overlapping shoulders the cone members and the tube to be bulged are held in correct position while the plunger 63 descends causing the end of the plunger 63 to enter the tube 12 at the top end and as it descends the non-compressible liquid 64 forces the wall 61 of the tube 12 outward against the walls of the cavity in the cone members of the die. The operation is so regulated that the plunger 63 is allowed to descend only far enough to bring the required amount of pressure upon the liquid and then the plunger is withdrawn. It is similar to the movement of the well known punch press, one movement of the plunger 63 in a downward direction to its predetermined correct distance, immediately followed by a return of the plunger to its maximum upward position. The press is then stopped, while the die is reloaded with another tube 12.

Following the above operation the tube 12 is removed from the cone members 62 and 62 of the die and placed in another bench block 71, while a plunger 72 is passed down through the tube 12 to push out the plug 41 which has held the end of the tube 12 sealed against the pressure required for the bulging operation.

The next step, referring to Figure 8, is a second grinding operation of the outside walls of tube 12 in which the outside diameter is brought down to its final diameter, within a very close tolerance of approximately minus four ten-thousandths of an inch. It will be noted here that the bulged appearance of the center portion of tube 12 has now disappeared as a result of this last grinding operation which means that the walls 61 and 61 are thinner than at the beginning of these operations and the outside of the tube is the same diameter throughout its length and is ready for the assembly of the wipers together with their insulating members to make up the wiper assembly.

Figure 9 refers to the next step, in which the two portions 31 and 32 of the tube are bored out to a tolerance of approximately five ten-thousandths of an inch and these portions of the tube form the bearing surfaces between the finished hub 15 and the shaft upon which it rotates.

The final operation is to thread, on the outside, a portion 16 at one end. The finished hub 15 is now complete and a ratchet wheel 11 is fitted over the end (as seen in Figure 12) of the hub 15 and brazed or otherwise permanently attached to the hub. In Figure 12 the finished hub 15 is shown in one embodiment as the hub of a rotary switch, in which the shaft 10 is stationary and the hub 15 rotates thereon. In another embodiment, the hub 15 would be stationary and the shaft 10 rotatable therein, supported by the two end bearing surfaces 31 and 32, both of which being lubricated by a lubricant stored within the space 9. A second wheel member 8, shown in Figure 15, is fixed to the shaft.

Another important feature of this invention includes a specially constructed device for removing the air and filling the tube with a non-compressible liquid, prior to the bulging operation. Removing all air from the interior of the tube before attempting the bulging operation is of the utmost importance. Figure 11 shows an air tight receptacle 92 in which the said liquid is stored. A pipe 93 attached to the top of the receptacle 92, leads to one side parallel to the base 94 supporting the receptacle 92. The end of the pipe 93 is turned down parallel to the center vertical axis of the receptacle 92. The pipe 93 ends in a small diameter tube 95, the outside diameter of which is slightly less than the reamed end portions 31 and 32 of tube 12. The receptacle 92 is provided with an air pump (not shown). One of the tubes, such as 12, with one end plugged, as shown in Figure 5 is placed on this small diameter tube 95 which is of sufficient length to descend to the bottom of the hollow cavity in the tube 12. The air is forced out of the tube 12 at the instant when the liquid is fed into the tube 12 from the receptacle 92, through the pipe line 93 and 95, by an operation of the handle of the pump (not shown) attached to receptacle 92. This is accomplished when the moving part of the press descends with plunger 63 to complete a bulging operation on a tube, such as 12, which has previously been filled and placed in the die of Figure 6.

What is claimed is:

1. The method of forming a hub which comprises closing one end of a tube to approximately one quarter of its length, filling the remaining portion with a non-compressible liquid, enclosing said tube in a forming die in which the two end portions, each of approximately one quarter the total length are firmly gripped and the said center portion of approximately one half the total length is surrounded by a cavity in said die, subjecting the liquid in said tube to pressure through the open end to cause the walls of said center portions to bulge to fill said cavity and grinding the outside surface of said bulged portion to cause the walls thereof to become thinner than the walls of the said end portions and to cause the outside diameter to the entire length of said tube to become uniform.

2. The method of manufacturing a bearing which comprises enclosing a tube member in a die having a snug fit with the end portions of said tube and an annular cavity surrounding the center portion of said tube, introducing a fluid into said tube, compressing said fluid to expand the center portion of the cylindrical wall of said tube until the outer surface of said tube conforms to said die, and machining the outer surface of said tube to eliminate the central bulge resulting from the expansion of said central portion against said die.

3. The method of manufacturing a bearing which comprises plugging one end of a tube member, enclosing said tube member in a die having a snug fit with the end portions of said tube and an annular cavity surrounding the center portion of said tube, introducing a fluid into said tube, compressing said fluid to expand the center portion of the cylindrical wall of said tube until the outer surface of said tube conforms to said die, and machining the outer surface of said tube to eliminate the bulge resulting from the expansion of said central portion against said die.

4. The method of manufacturing a bearing which comprises enclosing a tube member in a die having a snug fit with the end portion of said tube and an annular cavity surrounding the center portion of said tube, introducing a fluid into said tube, compressing said fluid to expand the center portion of the cylindrical wall of said tube until the outer surface of said tube conforms to said die, machining the outer surface of said tube to eliminate the central bulge resulting from the expansion of said central portion against said die, and reaming the end portion of said tube to provide bearing surfaces.

RICHARD J. NOVY.

REFERENCES CITED

The following references are of record in the file of this patent:

UNITED STATES PATENTS

| Number | Name | Date |
| --- | --- | --- |
| 608,950 | Brookes et al. | Aug. 9, 1898 |
| 616,764 | Bourke | Dec. 27, 1898 |
| 756,141 | Renner | Mar. 29, 1904 |
| 935,659 | Johnson | Oct. 5, 1909 |
| 1,004,992 | Benjamin | Oct. 3, 1911 |
| 1,237,423 | Vance | Aug. 21, 1917 |
| 1,766,098 | Booth | June 24, 1930 |
| 2,195,749 | Lignian | Apr. 2, 1940 |
| 2,210,132 | Searles | Aug. 6, 1940 |
| 2,350,854 | Whiteley | June 6, 1944 |
| 2,446,515 | Weingart | Aug. 3, 1948 |